US012798027B2

(12) United States Patent
Patil et al.

(10) Patent No.: US 12,798,027 B2
(45) Date of Patent: Nov. 17, 2026

(54) HOMING METHODS FOR LIFT ASSEMBLIES, AND RELATED APPARATUS AND COMPONENTS, FOR SUBSTRATE PROCESSING CHAMBERS

(71) Applicant: Applied Materials, Inc., Santa Clara, CA (US)

(72) Inventors: Aniketnitin Patil, San Jose, CA (US); Shu-Kwan Lau, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 310 days.

(21) Appl. No.: 18/416,346

(22) Filed: Jan. 18, 2024

(65) Prior Publication Data

US 2024/0326187 A1 Oct. 3, 2024

Related U.S. Application Data

(60) Provisional application No. 63/456,692, filed on Apr. 3, 2023.

(51) Int. Cl.
*B23Q 5/28* (2006.01)
*B23Q 7/14* (2006.01)

(52) U.S. Cl.
CPC ............ *B23Q 5/28* (2013.01); *B23Q 7/1405* (2013.01)

(58) Field of Classification Search
CPC ... B23Q 5/28; B23Q 5/02; B23Q 5/22; B23Q 5/54; B23Q 7/145; B23Q 7/002; B23Q 7/005; B23Q 7/04; B23Q 7/12; B23Q 7/16

(Continued)

(56) References Cited

U.S. PATENT DOCUMENTS 8,673,081 B2 3/2014 Sivaramakrishnan et al.
9,570,330 B2 2/2017 Hofmeister et al.

(Continued)

FOREIGN PATENT DOCUMENTS

CN 111725114 A 9/2020
CN 113990780 A 1/2022

(Continued)

OTHER PUBLICATIONS

International Search Report and Written Opinion dated May 13, 2024 for Application No. PCT/US2024/012073.

(Continued)

*Primary Examiner* — Sameh Tawfik
(74) *Attorney, Agent, or Firm* — Patterson + Sheridan, LLP

(57) ABSTRACT

The disclosure relates to homing methods for lift assemblies, and related apparatus and components, for processing chambers. In one or more embodiments, a non-transitory computer readable medium includes instructions that cause a plurality of operations to be conducted. The operations include detecting a fault condition, and determining a first position of a first support frame along a first movement range. The operations include determining a second position of a second support frame along a second movement range. The second movement range overlaps with the first movement range by an overlap range. The operations include determining if the first position is in an inside condition or an outside condition. The inside condition is within the overlap range, and the outside condition is outside of the overlap range. The operations include moving the first support frame and the second support frame respectively to a first retracted position and a second retracted position.

19 Claims, 11 Drawing Sheets

(58) Field of Classification Search
USPC ................................ 700/213, 214, 228, 229
See application file for complete search history.

(56) References Cited

U.S. PATENT DOCUMENTS

| | | | | |
|---|---|---|---|---|
| 9,620,395 | B2 | 4/2017 | Yang et al. | |
| 9,640,416 | B2 | 5/2017 | Arai | |
| 9,871,350 | B2 | 1/2018 | McLaurin et al. | |
| 9,875,895 | B2 | 1/2018 | Yang et al. | |
| 10,161,036 | B2 | 12/2018 | Hyon et al. | |
| 10,392,702 | B2 | 8/2019 | Jung et al. | |
| 10,741,396 | B2 | 8/2020 | Jung et al. | |
| 10,755,955 | B2 | 8/2020 | Ishii et al. | |
| 10,903,625 | B2 | 1/2021 | McLaurin et al. | |
| 11,111,580 | B2 | 9/2021 | Kang et al. | |
| 12,023,773 | B1 * | 7/2024 | Thomas | B23Q 3/18 |
| 12,221,696 | B2 * | 2/2025 | Cong | C23C 16/45517 |
| 12,462,214 | B2 * | 11/2025 | Grössl | G06Q 10/0833 |
| 12,467,144 | B2 * | 11/2025 | Zhu | C30B 25/14 |
| 12,584,240 | B2 * | 3/2026 | Bonham | C30B 25/12 |
| 2011/0048469 | A1 | 3/2011 | Ogata et al. | |
| 2013/0019803 | A1 * | 1/2013 | Samir | C23C 16/45565 118/725 |
| 2014/0261185 | A1 * | 9/2014 | Aboagye | C23C 16/45502 118/728 |
| 2017/0287769 | A1 * | 10/2017 | Ota | H10P 72/7612 |
| 2018/0315626 | A1 | 11/2018 | Franklin | |
| 2019/0105745 | A1 * | 4/2019 | Takeda | B25J 9/0018 |
| 2019/0386594 | A1 * | 12/2019 | Tsuneki | H02P 21/0003 |
| 2020/0272970 | A1 * | 8/2020 | Willard, III | G06Q 30/0635 |
| 2020/0294843 | A1 | 9/2020 | Ota et al. | |
| 2021/0028075 | A1 * | 1/2021 | Zhu | H10P 74/238 |
| 2021/0324514 | A1 | 10/2021 | Ye et al. | |
| 2022/0121196 | A1 | 4/2022 | Omori | |
| 2022/0162751 | A1 | 5/2022 | Haanstra et al. | |
| 2022/0170156 | A1 | 6/2022 | Jdira et al. | |
| 2022/0181122 | A1 | 6/2022 | Sim et al. | |
| 2022/0181193 | A1 | 6/2022 | Gao et al. | |
| 2022/0189804 | A1 | 6/2022 | Luan et al. | |
| 2022/0199444 | A1 | 6/2022 | Oosterlaken et al. | |
| 2022/0254668 | A1 | 8/2022 | Oosterlaken et al. | |
| 2022/0268520 | A1 | 8/2022 | Oosterlaken et al. | |
| 2022/0298643 | A1 | 9/2022 | Kajbafvala et al. | |
| 2022/0298672 | A1 | 9/2022 | M'Saad et al. | |
| 2022/0301829 | A1 | 9/2022 | Yoshikawa | |
| 2022/0301905 | A1 | 9/2022 | Ye et al. | |
| 2022/0301906 | A1 | 9/2022 | Naik et al. | |
| 2022/0352006 | A1 | 11/2022 | Huang et al. | |
| 2022/0359246 | A1 | 11/2022 | Umeoka | |
| 2022/0364263 | A1 * | 11/2022 | Bonham | C23C 16/4584 |
| 2022/0413452 | A1 * | 12/2022 | Shah | G05B 13/0265 |
| 2023/0143537 | A1 * | 5/2023 | Liu | H10P 72/53 427/300 |
| 2024/0021444 | A1 * | 1/2024 | Subbanna | H10P 72/0402 |
| 2024/0141498 | A1 * | 5/2024 | Zhu | C23C 16/52 |
| 2024/0175126 | A1 * | 5/2024 | Sowwan | B01D 53/18 |
| 2024/0278369 | A1 * | 8/2024 | Fukuoka | B23Q 5/28 |
| 2025/0076841 | A1 * | 3/2025 | Kamo | B23Q 15/12 |
| 2025/0349589 | A1 * | 11/2025 | Patil | G05B 13/0265 |
| 2026/0066231 | A1 * | 3/2026 | Sowwan | H01J 37/32201 |

FOREIGN PATENT DOCUMENTS

| | | | |
|---|---|---|---|
| CN | 111893567 | B | 2/2022 |
| CN | 114000192 | A | 2/2022 |
| CN | 111254487 | B | 3/2022 |
| CN | 114138030 | A | 3/2022 |
| CN | 114158145 | A | 3/2022 |
| CN | 114351249 | A | 4/2022 |
| CN | 216357351 | U | 4/2022 |
| CN | 110854044 | B | 5/2022 |
| CN | 111235551 | B | 5/2022 |
| CN | 114481311 | A | 5/2022 |
| CN | 114540947 | A | 5/2022 |
| CN | 114540948 | A | 5/2022 |
| CN | 114551331 | A | 5/2022 |
| CN | 114613703 | A | 6/2022 |
| CN | 114743924 | A | 7/2022 |
| CN | 114823428 | A | 7/2022 |
| CN | 114855272 | A | 8/2022 |
| CN | 114883221 | A | 8/2022 |
| CN | 114914181 | A | 8/2022 |
| CN | 114927450 | A | 8/2022 |
| CN | 115020281 | A | 9/2022 |
| CN | 115101432 | A | 9/2022 |
| CN | 115101443 | A | 9/2022 |
| CN | 115101470 | A | 9/2022 |
| CN | 115233303 | A | 10/2022 |
| CN | 115235257 | A | 10/2022 |
| CN | 115274510 | A | 11/2022 |
| CN | 115312432 | A | 11/2022 |
| CN | 115404543 | A | 11/2022 |
| JP | 2020053627 | A | 4/2020 |
| KR | 20110040771 | A | 4/2011 |
| KR | 20140038592 | A | 3/2014 |
| KR | 20180080139 | A | 7/2018 |

OTHER PUBLICATIONS

Korean Office Action for Application No. 10-2025-7036208 dated Jul. 27, 2026.

* cited by examiner

HOMING METHODS FOR LIFT ASSEMBLIES, AND RELATED APPARATUS AND COMPONENTS, FOR SUBSTRATE PROCESSING CHAMBERS

CROSS-REFERENCE TO RELATED APPLICATION

This application claims priority to U.S. provisional patent application Ser. No. 63/456,692, filed Apr. 3, 2023, which is herein incorporated by reference in its entirety.

BACKGROUND

Field

The present disclosure relates to homing methods for lift assemblies, and related apparatus and components, for substrate processing chambers.

Description of the Related Art

Semiconductor substrates are processed for a wide variety of applications, including the fabrication of integrated devices and microdevices. However, operations (such as epitaxial deposition operations) can be long, expensive, and inefficient, and can have limited capacity and throughput. Moreover, hardware can involve relatively large dimensions that occupy higher footprints in manufacturing facilities. For example, movement of certain components may be limited by other components during substrate transfer operations. As an example, it may be unfeasible to move two components simultaneously at a given point in time. As another example, it may unfeasible at a given point in time to move a first component without first moving a second component. Such limitations of movement may cause extraneous movement or delays in movement, which can affect processing time and throughput.

Additionally movement of components can involve collision, damage, and/or failure of components, which can involve chamber downtime, processing delays, and/or increased costs. For example, dimensions and footprints can increase chances of collision.

Such hindrances can be exacerbated in relatively complex processing operations, such as batch epitaxial processing.

Therefore, a need exists for improved apparatuses and methods in semiconductor processing.

SUMMARY

The present disclosure relates to homing methods for lift assemblies, and related apparatus and components, for substrate processing chambers. In one or more embodiments, a lift assembly can be used to independently move lift pin(s) and substrate support(s).

In one or more embodiments, a non-transitory computer readable medium includes instructions that, when executed, cause a plurality of operations to be conducted. The plurality of operations include detecting a fault condition, and determining a first position of a first support frame along a first movement range. The plurality of operations include determining a second position of a second support frame along a second movement range. The second movement range overlaps with the first movement range by an overlap range. The plurality of operations include determining if the first position is in an inside condition or an outside condition. The inside condition is within the overlap range, and the outside condition is outside of the overlap range. The plurality of operations include moving the first support frame and the second support frame respectively to a first retracted position and a second retracted position.

In one or more embodiments, a lift assembly for disposition in relation to a substrate processing chamber includes a first motor, a first drive assembly coupled to the first motor, and a first support block coupled to the first drive assembly. The first motor is configured to linearly move the first support block using the first drive assembly. The lift assembly includes a second motor, a second drive assembly coupled to the second motor, and a second support block coupled to the second drive assembly. The second motor is configured to linearly move the second support block using the second drive assembly. The second motor is configured to linearly move the second support block independently of the first motor linearly moving the first support block. The lift assembly includes a controller in communication with the first motor and the second motor. The controller includes instructions that, when executed by a processor, cause a plurality of operations to be conducted. The plurality of operations include detecting a fault condition, and determining a first position of the first support block along a first movement range. The plurality of operations include determining a second position of the second support block along a second movement range. The second movement range overlaps with the first movement range by an overlap range. The plurality of operations include determining if the first position is in an inside condition or an outside condition. The inside condition is within the overlap range, and the outside condition is outside of the overlap range. The plurality of operations include moving the first support block and the second support block respectively to a first retracted position and a second retracted position.

In one or more embodiments, a method of transferring substrates includes moving a first substrate into a chamber, and raising a second support frame relative to a first support frame to engage the first substrate. The first support frame includes a first shaft and a plurality of first arms, and the second support frame includes a second shaft and a plurality of second arms. The method includes lowering the second support frame relative to the first support frame to land the first substrate on a first substrate support. The method includes detecting a fault condition, determining a first position of the first support frame along a first movement range, and determining a second position of the second support frame along a second movement range. The second movement range overlaps with the first movement range by an overlap range. The method includes determining if the first position is in an inside condition or an outside condition. The inside condition is within the overlap range, and the outside condition is outside of the overlap range. The method includes lowering the first support frame and the second support frame respectively to a first retracted position and a second retracted position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to homing methods for lift assemblies, and related apparatus and components, for substrate processing chambers. In one or more embodiments, a lift assembly can be used to independently move lift pin(s) and substrate support(s).

The disclosure contemplates that terms such as “couples,” “coupling,” “couple,” and “coupled” may include but are not limited to welding, fusing, melting together, interference fitting, and/or fastening such as by using bolts, threaded connections, pins, and/or screws. The disclosure contemplates that terms such as “couples,” “coupling,” “couple,” and “coupled” may include but are not limited to integrally forming. The disclosure contemplates that terms such as “couples,” “coupling,” “couple,” and “coupled” may include but are not limited to direct coupling and/or indirect coupling, such as indirect coupling through components such as links, blocks, and/or frames.

Figure 1:
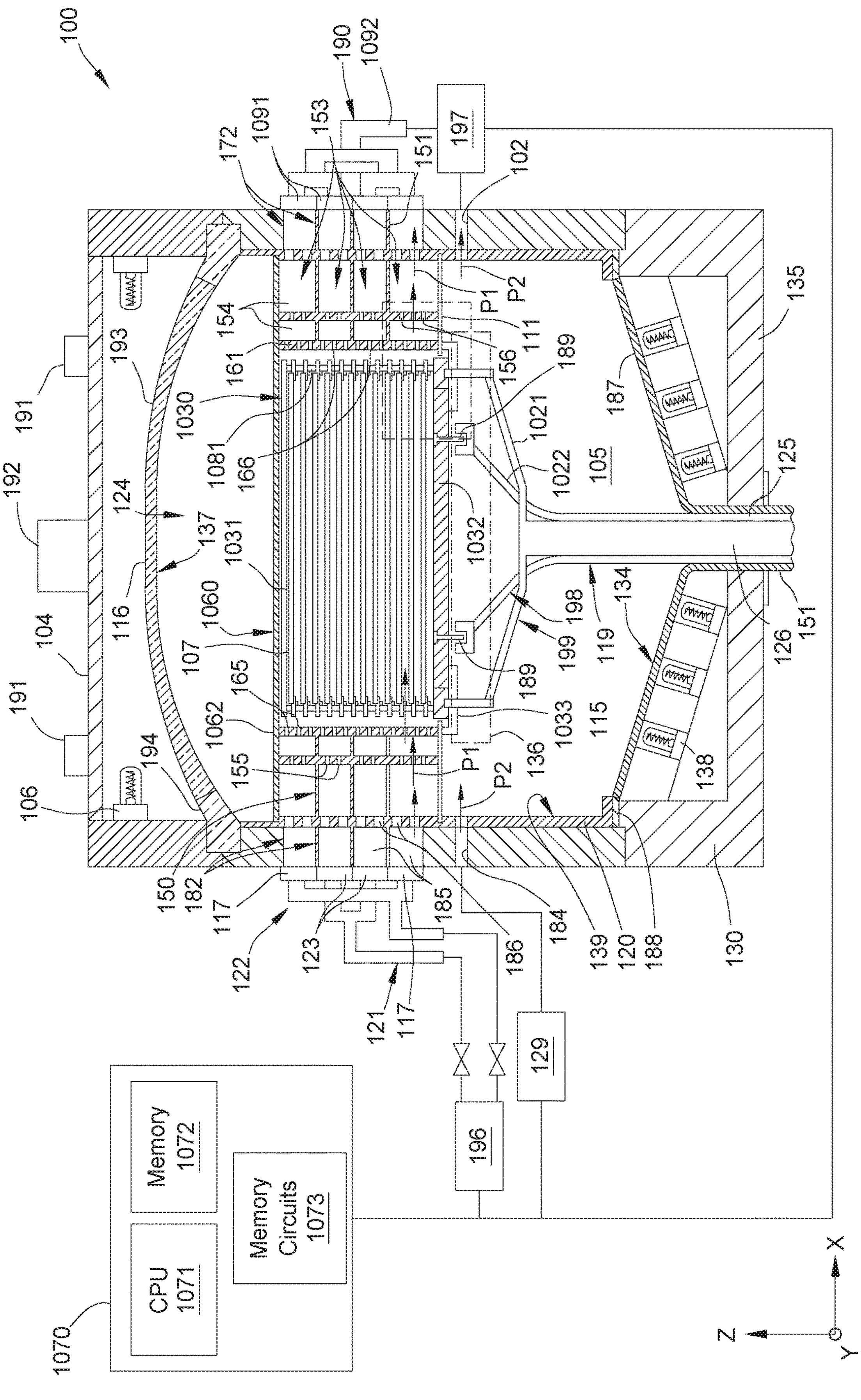
FIG. 1 is a schematic cross-sectional side view of a processing apparatus, according to one or more embodiments.
Figure 2:
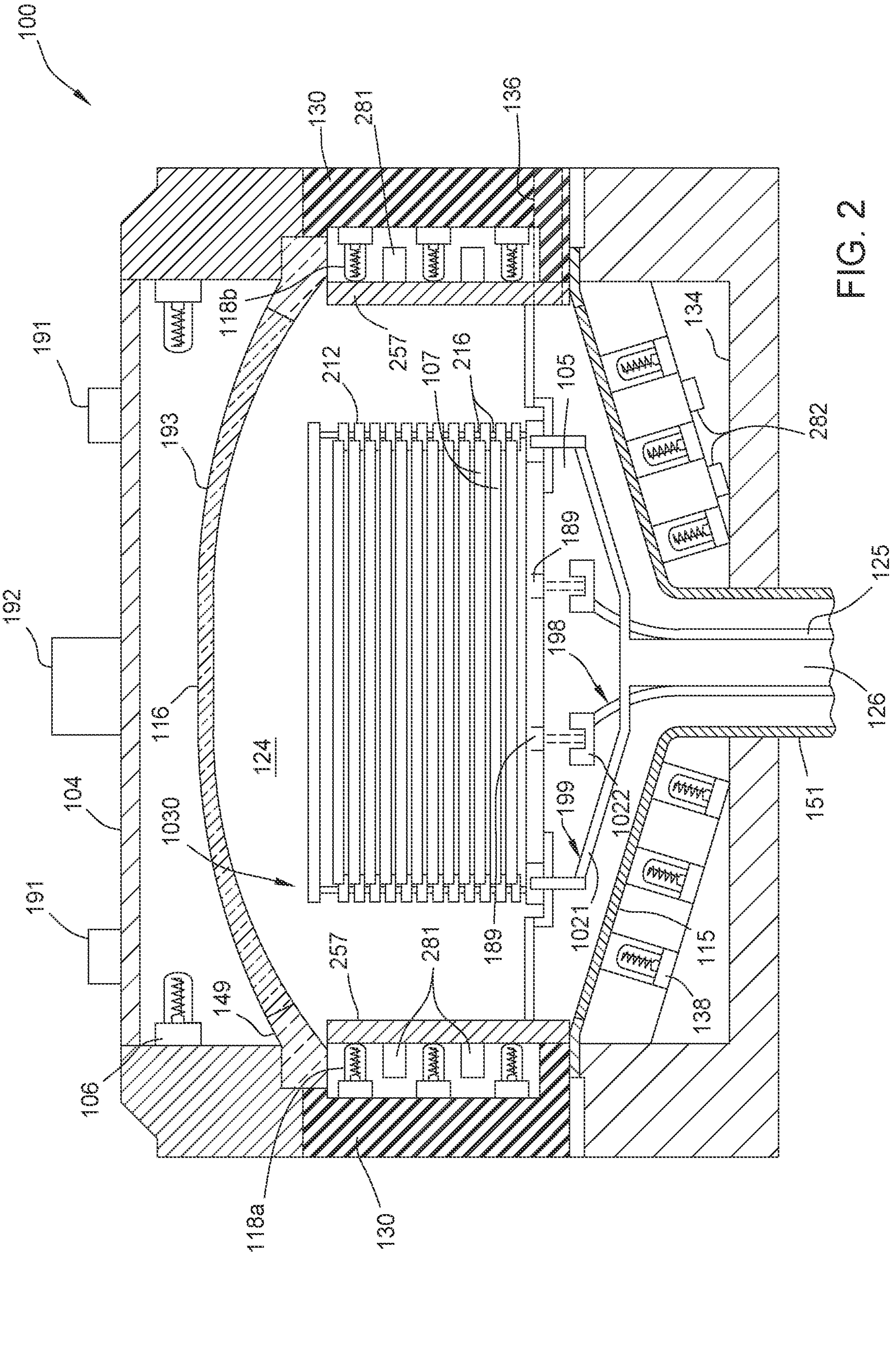
FIG. 2 is a schematic cross-sectional side view of the processing apparatus shown in FIG. 1, according to one or more embodiments.

FIG. 1 is a schematic cross-sectional side view of a processing apparatus 100, according to one or more embodiments. The side heat sources 118*a*, 118*b* shown in FIG. 2 are not shown in FIG. 1 for visual clarity purposes. The processing apparatus 100 includes a processing chamber having a chamber body 130 that defines a processing volume 124.

A cassette 1030 is positioned in the processing volume 124 and at least partially supported by a substrate support assembly 119 (such as a pedestal assembly). The cassette 1030 is positioned inwardly of the first shield plate 161. The cassette 1030 includes a first cassette plate 1032, a second cassette plate 1031 spaced from the first cassette plate 1032, and a plurality of levels that support a plurality of substrates 107 for simultaneous processing (e.g., epitaxial deposition). In the implementation shown in FIG. 1, the cassette 1030 supports twelve substrates. The cassette 1030 can support other numbers of substrates, including but not limited to two substrates 107, three substrates 107, six substrates 107, or eight substrates 107.

The processing apparatus 100 includes an upper window 116, such as a dome, disposed between a lid 104 and the processing volume 124. The processing apparatus 100 includes a lower window 115 disposed below the processing volume 124. One or more upper heat sources 106 are positioned above the processing volume 124 and the upper window 116. The one or more upper heat sources 106 can be radiant heat sources such as lamps, for example halogen lamps. In one or more embodiments, the lamps are operable to emit infrared light and/or ultraviolet light. The one or more upper heat sources 106 are disposed between the upper window 116 and the lid 104. The upper heat sources 106 are positioned to provide uniform heating of the substrates 107. One or more lower heat sources 138 are positioned below the processing volume 124 and the lower window 115. The one or more lower heat sources 138 can be radiant heat sources such as lamps, for example halogen lamps. In one or more embodiments, the lamps are operable to emit infrared light and/or ultraviolet light. The lower heat sources 138 are disposed between the lower window 115 and a floor 134 of the processing volume 124. The lower heat sources 138 are positioned to provide uniform heating of the substrates 107.

The present disclosure contemplates that other heat sources may be used (in addition to or in place of the lamps) for the various heat sources described herein. For example, resistive heaters, light emitting diodes (LEDs), and/or lasers may be used for the various heat sources described herein.

The upper and lower windows 116, 115 may be transparent to the infrared radiation, such as by transmitting at least 95% of infrared radiation. The upper and lower windows 116, 115 may be a quartz material (such as a transparent quartz). In one or more embodiments, the upper window 116 includes an inner window 193 and outer window supports 194. The inner window 193 may be a thin quartz window that partially defines the processing volume 124. The outer window supports 194 support the inner window 193 and are at least partially disposed within a support groove. In one or more embodiments, the lower window 115 includes an inner window 187 and outer window supports 188. The inner window 187 may be a thin quartz window that partially defines the processing volume 124. The outer window supports 188 support the inner window 187.

The substrate support assembly 119 is disposed in the processing volume 124. One or more liners 120 are disposed in the processing volume 124 and surround the substrate support assembly 119. The one or more liners 120 facilitate shielding the chamber body 130 from processing chemistry in the processing volume 124. The chamber body 130 is disposed at least partially between the upper window 116 and the lower window 115. The one or more liners 120 are disposed between the processing volume 124 and the chamber body 130.

The processing apparatus 100 includes a plurality of gas inject passages 182 formed in the chamber body 130 and in fluid communication with the processing volume 124, and one or more gas exhaust passages 172 (a plurality is shown in FIG. 1) formed in the chamber body 130 opposite the plurality of gas inject passages 182. The one or more gas exhaust passages 172 are in fluid communication with the processing volume 124. The plurality of gas inject passages 182 and the one or more gas exhaust passages 172 are respectively formed through one or more sidewalls of the chamber body 130 and through one or more liners 120 that line the one or more sidewalls of the chamber body 130.

Each gas inject passage 182 includes a gas channel 185 formed in the chamber body 130 and one or more gas openings 186 (two and three are shown in FIG. 1) formed in the one or more liners 120. One or more supply conduit systems are in fluid communication with the gas inject passages 182. In FIG. 1, an inner supply conduit system 121 and an outer supply conduit system 122 are in fluid communication with the gas inject passages 182. The inner supply conduit system 121 includes a plurality of inner gas boxes 123 mounted to the chamber body 130 and in fluid communication with an inner set of the gas inject passages 182. The outer supply conduit system 122 includes a plurality of outer gas boxes 117 mounted to the chamber body 130 and in fluid communication with an outer set of the gas inject passages 182. The present disclosure contemplates that a variety of gas supply systems (e.g., supply conduit system(s), gas inject passages, and/or gas boxes different than what is shown in FIG. 1) may be used.

The processing apparatus 100 includes a flow guide structure 150 positioned in the processing volume 124. The flow guide structure 150 divides the processing volume into a plurality of flow levels 153 (four flow levels are shown in FIG. 1). In one or more embodiments, the flow guide structure 150 includes at least three flow levels 153 and a plurality of flow sections 154 (two flow sections 154 are shown for each flow level 153 in FIG. 1). The plurality of gas inject passages are 182 positioned as a plurality of inject levels such that each gas inject passage 182 corresponds to one of the plurality of inject levels. Each inject level aligns with a respective flow level 153. The processing apparatus 100 includes a heat shield structure 1060 positioned in the processing volume 124. The heat shield structure 1060 includes a first shield plate 161 and a second shield plate 1062.

The flow guide structure 150 includes a plurality of divider inlet openings 155 and a plurality of divider outlet openings 156 formed therein. The divider outlet openings 156 are opposite of the divider inlet openings 155. The heat shield structure 1060 includes a plurality of shield inlet openings 165 and a plurality of shield outlet openings 166 formed therein. The flow guide structure 150 and/or the heat shield structure 1060 are formed of one or more of quartz (such as transparent quartz—e.g. clear quartz, opaque quartz—e.g., grey quartz and/or white quartz, and/or black quartz), silicon carbide (SiC), and/or graphite coated with SiC.

The cassette 1030 is positioned inwardly of the first shield plate 161. A pre-heat ring 111 is positioned outwardly of the cassette 1030. The pre-heat ring 111 is coupled to and/or at least partially supported by the one or more liners 120. Portions of the flow guide structure 150 may act as a pre-heat ring for all flow sections 154 of each flow level 153. The pre-heat ring 111 may be part of (such as integrated with) the flow guide structure 150.

As described below, the present disclosure contemplates that the flow guide structure 150 and/or the heat shield structure 1060 can be omitted.

During operations (such as during an epitaxial deposition operation), one or more process gases P1 are supplied to the processing volume 124 through the inner supply conduit system 121 and the outer supply conduit system 122, and through the plurality of gas inject passages 182. The one or more process gases P1 are supplied from one or more gas sources 196 in fluid communication with the plurality of gas inject passages 182. Each of the gas inject passages 182 is configured to direct the one or more processing gases P1 in a generally radially inward direction towards the cassette 1030. As such, in one or more embodiments, the gas inject passages 182 may be part of a cross-flow gas injector. The flow(s) of the one or more process gases P1 can be divided into a plurality of flow levels 153.

The processing apparatus 100 includes an exhaust conduit system 190. The one or more process gases P1 can be exhausted through exhaust gas openings formed in the one or more liners 120, exhaust gas channels formed in the chamber body 130, and then through exhaust gas boxes 1091. The one or more process gases P1 can flow from exhaust gas boxes 1091 and to an optional common exhaust box 1092, and then out through a conduit using one or more pump devices 197 (such as one or more vacuum pumps).

The one or more processing gases P1 can include, for example, purge gases, cleaning gases, and/or deposition gases. The deposition gases can include, for example, one or more reactive gases carried in one or more carrier gases. The one or more reactive gases can include, for example, silicon and/or germanium containing gases (such as silane ($SiH_4$), disilane ($Si_2H_6$), dichlorosilane ($SiH_2Cl_2$), and/or germane ($GeH_4$)), chlorine containing etching gases (such as hydrogen chloride (HCl)), and/or dopant gases (such as phosphine ($PH_3$) and/or diborane ($B_2H_6$)). The one or more purge gases can include, for example, one or more of argon (Ar), helium (He), nitrogen ($N_2$), hydrogen chloride (HCl), and/or hydrogen ($H_2$).

Purge gas P2 supplied from a purge gas source 129 is introduced to the bottom region 105 of the processing volume 124 through one or more purge gas inlets 184 formed in the sidewall of the chamber body 130.

The one or more purge gas inlets 184 are disposed at an elevation below the gas inject passages 182. If the one or more liners 120 are used, a section of the one or more liners 120 may be disposed between the gas inject passages 182 and the one or more purge gas inlets 184. The one or more purge gas inlets 184 are configured to direct the purge gas P2 in a generally radially inward direction. The one or more purge gas inlets 184 may be configured to direct the purge gas P2 in an upward direction. During a film formation process, the substrate support assembly 119 is located at a position that can facilitate the purge gas P2 to flow generally along a flow path across a back side of the cassette 1030. The purge gas P2 exits the bottom region 105 and is exhausted out of the processing apparatus 100 through one or more purge gas exhaust passages 102 located on the opposite side of the processing volume 124 relative to the one or more purge gas inlets 184.

The substrate support assembly 119 includes a first support frame 199 and a second support frame 198 disposed at least partially about the first support frame 199. The first support frame 199 includes arms coupled to the cassette 1030 such that lifting and lowering the first support frame 199 lifts and lowers the cassette 1030. A plurality of lift pins 189 are suspended from the cassette 1030. Lowering of the cassette 1030 and/or lifting of the second support frame 198 initiates contact of the lift pins 189 with arms of the second support frame 198. Continued lowering of the cassette 1030 and/or lifting of the second support frame 198 initiates contact of the lift pins 189 with the substrates in the cassette 1030 such that the lift pins 189 raise the substrates in the cassette 1030. A bottom region 105 of the processing apparatus 100 is defined between the floor 134 and the cassette 1030.

A first shaft 126 of the first support frame 199, a second shaft 125 of the second support frame 198, and a section 151 of the lower window 115 extend through a port formed in a bottom 135 of the chamber body 130 and the floor 134. As described below, each shaft 125, 126 is coupled to one or more respective motors, which are configured to independently raise, lower, and/or rotate the cassette 1030 using the first support frame 199, and to independently raise and lower the lift pins 189 using the second support frame 198. The first support frame 199 includes the first shaft 126 and a plurality of first arms 1021 configured to support the cassette 1030 that includes one or more substrate supports 212. The second support frame 198 includes the second shaft 125 and a plurality of second arms 1022 configured to interface with and support the lift pins 189.

An opening 136 (a substrate transfer opening) is formed through the one or more sidewalls of the chamber body 130. The opening 136 may be used to transfer the substrates 107 to or from the cassette 1030, e.g., in and out of the processing volume 124. In one or more embodiments, the opening 136 includes a slit valve. In one or more embodiments, the opening 136 may be connected to any suitable valve that enables the passage of substrates therethrough. The opening 136 is shown in ghost in FIGS. 1 and 2 for visual clarity purposes.

The processing apparatus 100 may include one or more temperature sensors 191, 192, 282, such as optical pyrometers, which measure temperatures within the processing apparatus 100 (such as on the surfaces of the upper window 116, and/or one or more surfaces of the substrates 107, the heat shield structure 1060, and/or the cassette 1030). The one or more temperature sensors 191, 192 are disposed on the lid 104. The one or more temperature sensors 282 (e.g., lower pyrometers) are disposed on a lower side of the lower window 115. The one or more temperature sensors 282 can be disposed adjacent to and/or on the bottom 135 of the chamber body 130.

In one or more embodiments, upper temperature sensors 191, 192 are oriented toward a top of the cassette 1030 (such as an upper surface of the second cassette plate 1031. In one or more embodiments, side temperature sensors 281 are oriented toward the first shield plate 161 and/or substrate supports 212 of the cassette 1030. In one or more embodiments, lower temperature sensors 282 are oriented toward a bottom of the cassette 1030 (such as a lower surface of the first cassette plate 1032.

The processing apparatus 100 includes a controller 1070 configured to control the processing apparatus 100 or components thereof. For example, the controller 1070 may control the operation of components of the processing apparatus 100 using a direct control of the components or by controlling controllers associated with the components. In operation, the controller 1070 enables data collection and feedback from the respective chambers to coordinate and control performance of the processing apparatus 100.

The controller 1070 generally includes a central processing unit (CPU) 1071, a memory 1072, and support circuits 1073. The CPU 1071 may be one of any form of a general purpose processor that can be used in an industrial setting. The memory 1072, or non-transitory computer readable medium, is accessible by the CPU 1071 and may be one or more of memory such as random access memory (RAM), read only memory (ROM), floppy disk, hard disk, or any other form of digital storage, local or remote. The support circuits 1073 are coupled to the CPU 1071 and may include cache, clock circuits, input/output subsystems, power supplies, and the like.

The various methods (such as the method 700 and/or the method 900) and operations disclosed herein may generally be implemented under the control of the CPU 1071 by the CPU 1071 executing computer instruction code stored in the memory 1072 (or in memory of a particular processing chamber) as, e.g., a software routine. When the computer instruction code is executed by the CPU 1071, the CPU 1071 controls the components of the processing apparatus 100 to conduct operations in accordance with the various methods and operations described herein. In one or more embodiments, the memory 1072 (a non-transitory computer readable medium) includes instructions stored therein that, when executed, cause the methods (such as the method 700 and/or the method 900) and operations (such as the operations 702-734 and/or the operations 902-910) described herein to be conducted. The operations described herein can be stored in the memory 1072 in the form of computer readable logic. The controller 1070 can be in communication with the heat sources, the gas sources, and/or the vacuum pump(s) of the processing apparatus 100, for example, to cause a plurality of operations to be conducted. The controller 1070 can control the lift assembly 300 described below. The controller 1070 can control, for example, the motors 310, 340, 370 described below to conduct at least part of the method 700 and/or the method 900.

The controller 1070 can include one or more machine learning and/or artificial intelligence (ML/AI) algorithms. The one or more ML/AI algorithms can optimize the detection of the fault condition (of operation 902) and optimize the conduction of operations 904, 906, 908, 910 of the method 900 based on the detection of the fault condition. The one or more ML/AI algorithms can use, for example, a regression model (such as a linear regression model) or a clustering technique to estimate optimized parameters. The algorithm can be unsupervised or supervised. In one or more embodiments, the controller 1070 automatically conducts the operations described herein without the use of one or more ML/AI algorithms. In one or more embodiments, the controller 1070 compares measurements to data in a look-up table and/or a library to determine if the fault condition is detected. The controller 1070 can store measurements as data in the look-up table and/or the library.

FIG. 2 is a schematic cross-sectional side view of the processing apparatus 100 shown in FIG. 1, according to one or more embodiments. The cross-sectional view shown in FIG. 2 is rotated by 55 degrees relative to the cross-sectional view shown in FIG. 1.

The processing apparatus 100 includes one or more side heat sources 118*a*, 118*b* (e.g., side lamps, side resistive heaters, side LEDs, and/or side lasers, for example) positioned outwardly of the processing volume 124. One or more second side heat sources 118*b* are opposite one or more first side heat sources 118*a* across the processing volume 124.

In FIG. 2, the flow guide structure 150 and the heat shield structure 1060 are not shown for visual clarity purposes. Additionally, the present disclosure contemplates that the flow guide structure 150 and/or the heat shield structure 1060 can be omitted from the processing apparatus 100 shown in FIGS. 1-2. In such an embodiment, the one or more process gases P1 flow into an outer annulus of the processing volume 124 from the gas inject passages 182, and then flow into openings 216 between and outwardly of substrate supports 212 (e.g., arcuate supports) of the cassette 1030, and then into gaps between the substrates 107. The one or more process gases P1 flow out of the gaps, into the openings 216 (between and outwardly of substrate supports) on an exhaust side of the substrates 107, into the outer annulus of the processing volume 124, and into the one or more gas exhaust passages 172. The present disclosure also contemplates that a plurality of lines (such as conduits) in the processing volume 124 can connect each of the gas inject passages 182 to each of the inlet openings of the cassette 1030.

In addition to the one or more temperature sensors 191, 192 positioned above the processing volume 124 and above the second shield plate 1062, the processing apparatus 100 may include one or more temperature sensors 281, such as optical pyrometers, which measure temperatures within the processing apparatus 100 (such as on the surfaces of the upper window 116 and/or one or more surfaces of the substrates 107, the heat shield structure 1060, a plurality of windows 257, and/or the cassette 1030). The plurality of windows 257—if used—can be disposed in gaps between or formed in the one or more liners 120. The one or more temperature sensors 281 are side temperature sensors (e.g., side pyrometers) that are positioned outwardly of the processing volume 124, outwardly of the flow guide structure 150, and outwardly of the plurality of windows 257. The one or more temperature sensors 281 can be radially aligned, for example, with the plurality of windows 257 (as shown in FIG. 2).

The one or more side temperature sensors 281 (such as one or more pyrometers) can be used to measure temperatures within the processing volume 124 from respective sides of the processing volume 124. The side sensors 281 are arranged in a plurality of sensor levels (three sensor levels are shown in FIG. 2). In one or more embodiments, the number of sensor levels is equal to the number of heat source levels. Each side sensor 281 can be oriented horizontally or can be directed (e.g., oriented downwardly at an angle) toward the substrate 107 and the substrate support 212 of a respective level of the cassette 1030.

The cassette 1030 that supports the plurality of substrates 107 is shown in FIGS. 1 and 2. The present disclosure contemplates that the subject matter described herein can be used in relation to a substrate support (such as a pedestal and/or one or more ring segments) that support a single substrate during processing.

Figure 3:
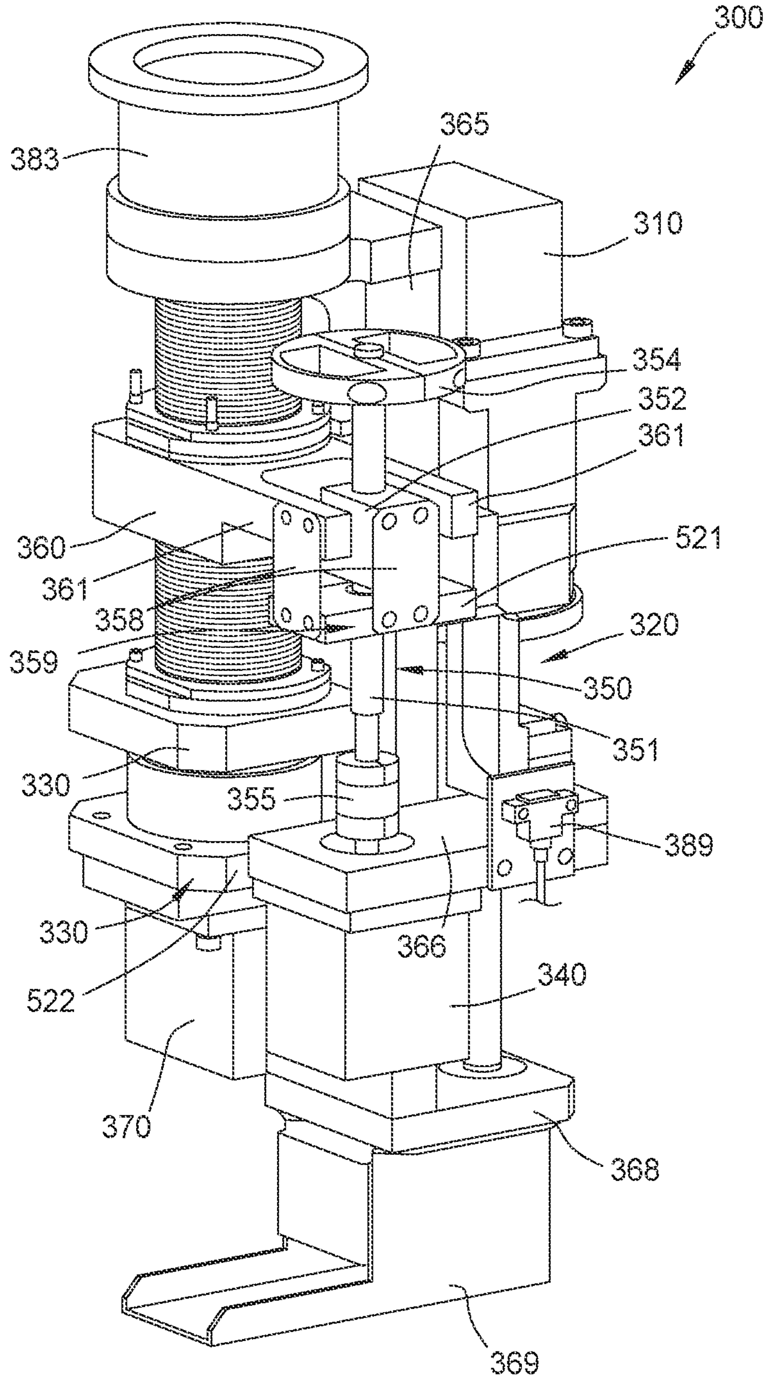
FIG. 3 is a partial schematic perspective front view of a first side of a lift assembly, according to one or more embodiments.

FIG. 3 is a partial schematic perspective front view of a first side of a lift assembly 300, according to one or more embodiments.

Figure 4:
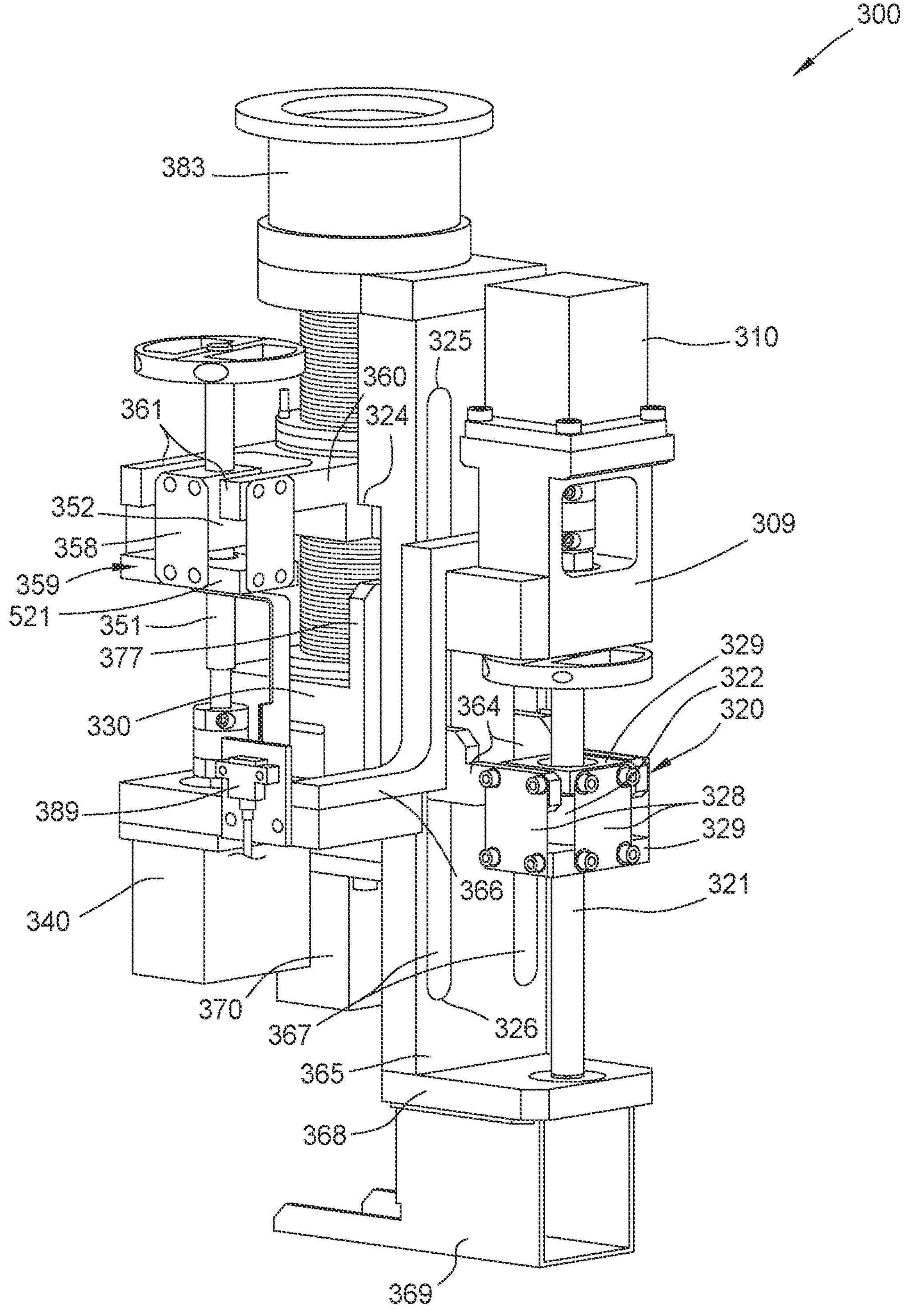
FIG. 4 is a partial schematic perspective back view of the first side of the lift assembly shown in FIG. 3, according to one or more embodiments.

FIG. 4 is a partial schematic perspective back view of the first side of the lift assembly 300 shown in FIG. 3, according to one or more embodiments.

Figure 5:
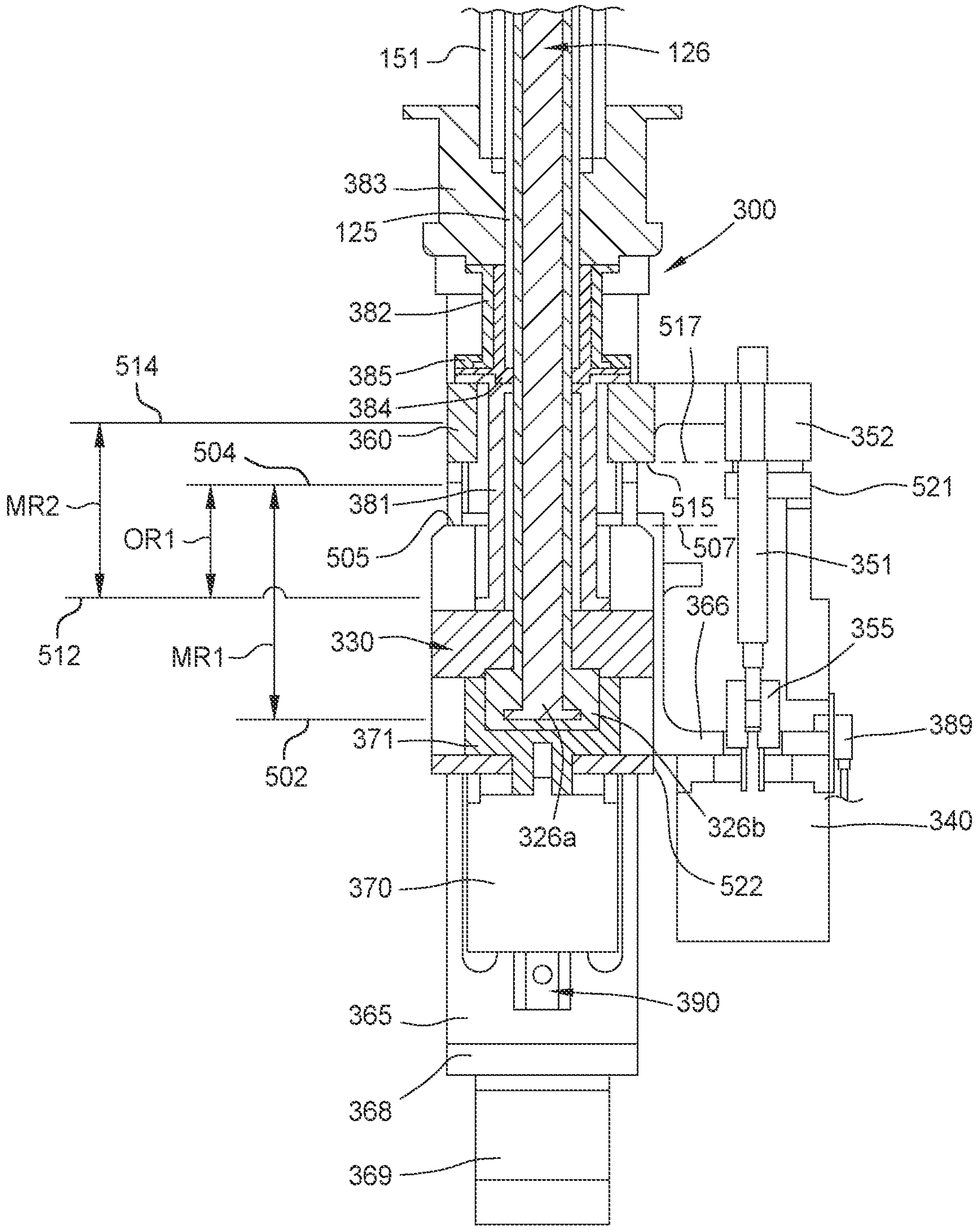
FIG. 5 is a partial schematic side cross-sectional view of the lift assembly shown in FIGS. 3 and 4, according to one or more embodiments.

The lift assembly 300 is coupled the processing apparatus 100. For example, as shown in FIG. 5, the lift assembly 300 is coupled to the first shaft 126, the second shaft 125, and/or the section 151 of the lower window 115.

The lift assembly 300 includes a first motor 310, a first drive assembly 320 coupled to the first motor 310, and a first support block 330 (e.g., a first support bracket) coupled to the first drive assembly 320. In one or more embodiments, the first support block 330 is a substrate support block. The first motor 301 is mounted to a motor block 309. The first motor 310 is configured to linearly move the first support block 330 using the first drive assembly 320. The first drive assembly 320 includes a first drive shaft 321 coupled to the first motor 310, and a first traveling block 322 disposed along the first drive shaft 321. The first traveling block 322 is coupled to the first support block 330 and is configured to linearly move along the first drive shaft 321. In one or more embodiments, a plurality of plates 328, 329 are coupled to the first support block 330 and/or the first traveling block 322. The first motor 310 is configured to rotate the first drive shaft 321 to move the first traveling block 322 such that the first support block 330 moves with the first traveling block 322. In one or more embodiments, the first drive shaft 321 is a first lead screw, and a first threaded interface is between the first lead screw and the first traveling block 322 such that rotation of the first drive shaft 321 linearly moves the first traveling block 322 along the first drive shaft 321.

The lift assembly 300 includes a second motor 340, a second drive assembly 350 coupled to the second motor 340, and a second support block 360 coupled to the second drive assembly 350. In one or more embodiments, the second support block 360 is a lift pin support block. The second motor 340 is configured to linearly move the second support block 360 using the second drive assembly 350. The second motor 340 is configured to linearly move the second support block 360 independently of the first motor 310 linearly moving the first support block 330. The second drive assembly 350 includes a second drive shaft 351 coupled to the second motor 340, and a second traveling block 352 disposed along the second drive shaft 351. The second traveling block 352 is coupled to the second support block 360 and is configured to linearly move along the second drive shaft 351. In one or more embodiments, the second traveling block 352 is coupled to the second support block 360 using a plurality of plates 358, 359. The second motor 340 is configured to rotate the second drive shaft 351 to move the second traveling block 352 such that the second support block 360 moves with the second traveling block 352. In one or more embodiments, the second drive shaft 351 is a second lead screw, and a second threaded interface is between the second lead screw and the second traveling block 352 such that rotation of the second drive shaft 351 linearly moves the second traveling block 352 along the second drive shaft 351.

The second drive assembly 350 includes one or more stops 354, 355 (such as a wheel and/or a barrel) disposed along the second drive shaft 351 to limit the linear movement of the second traveling block 352 (and the second support block 360).

The lift assembly 300 includes a support beam 365, and a mount block 366 coupled to the support beam 365. The first motor 310 and the second motor 340 are coupled to the mount block 366. The motor block 309 can be coupled to the support beam 365 through the mount block 366, or the motor block 309 can be coupled directly to the support beam 365. The support beam 365 includes one or more tracks 367 interfacing with the first support block 330. In one or more embodiments, the one or more tracks 367 are one or more openings (e.g., apertures) formed in the support beam 365, and the first support block 330 includes one or more first legs 364 (such as two legs) that extend through the one or more tracks 367 and couple to the first traveling block 322. In one or more embodiments, the second support block 360 includes one or more second legs 361 that couple to the second traveling block 352.

One or more stops 324, 325, 326 (such as ledge(s) of the support beam 365 and/or end(s) of the one or more tracks 367) limit the linear movement of the first support block 330 (and the first traveling block 322). As an example, a front plate 377 of the first support block 330 can move to abut against a first stop 324. As another example, the first legs 364 of the first support block 330 can move between two stops 325, 326.

The support beam 365 is coupled to a base block 368, and the base block 368 is coupled to a base frame 369. The base frame 369 mounts the lift assembly 300 to a structure. For example, the base frame 369 can coupled to a mainframe of a cluster tool.

The lift assembly 300 includes a third motor 370 coupled to the first support block 330. In one or more embodiments, the third motor 370 linearly moves with the linear movement of the first support block 330.

FIG. 5 is a partial schematic side cross-sectional view of the lift assembly 300 shown in FIGS. 3 and 4, according to one or more embodiments. Hatching is not shown for some components for visual clarity purposes. The respective shafts 125, 126 can be integrally formed, or can include one or more components coupled together. In the implementation shown in FIG. 5, the first shaft 126 includes an inner rod 326*a* and an outer rod 326*b*. The respective rods 326*a*, 326*b* can be integrally formed, or can include one or more components coupled together.

The first support block 330 supports the first shaft 126 of the first support frame 199 such that linear movement of the first support block 330 linearly moves the first support frame 199 to raise and/or lower the first support frame 199. Linear movement of the first traveling block 322 (which is driven by the first motor 310 rotating the first drive shaft 321) linearly moves the first support block 330 and the first support frame 199. In one or more embodiments, the first shaft 126 is coupled to the first support block 330 (e.g., using fasteners and/or interference fitting of overlapping shoulders).

The second support block 360 supports the second shaft 125 of the second support frame 198 such that linear movement of the second support block 360 linearly moves the second support frame 198 to raise and/or lower the second support frame 198. Linear movement of the second traveling block 352 (which is driven by the second motor 340 rotating the second drive shaft 351) linearly moves the second support block 360 and the second support frame 198. The second motor 340 is configured to linearly move (e.g., raise and/or lower) the second traveling block 352, the second support block 360, and the second support frame 198 independently of the first motor 310 linearly moving (e.g., raising and/or lowering) the first traveling block 322, the first support block 330, and the first support frame 199. In one or more embodiments, the second shaft 125 is coupled to the second support block 360 (e.g., using fasteners and/or interference fitting of overlapping shoulders).

The first support block 330 is linearly movable along a first movement range MR1. The first movement range MR1 is between a first end linear position 502 and a second end linear position 504. An upper end 505 of the first support block 330 is movable in the first movement range MR1 between the first end linear position 502 and the second end linear position 504. A position 507 of the upper end 505 along the first movement range MR1 can be determined (e.g., tracked) during operations. The position 507 can be correlated to a position of the first support frame 199. The first end linear position 502 defines a first retracted position (such as a home position) for the first support block 330. In one or more embodiments, the first retracted position is a zero position below which the first support block 330 cannot be moved.

The second support block 360 is linearly movable along a second movement range MR2. The second movement range MR2 is between a first end linear position 512 and a second end linear position 514. A lower end 515 of the second support block 360 is movable in the second movement range MR2 between the first end linear position 512 and the second end linear position 514. A position 517 of the lower end 515 along the second movement range MR2 can be determined (e.g., tracked) during operations. The position 517 can be correlated to a position of the second support frame 198. The first end linear position 512 defines a second retracted position (such as a home position) for the second support block 360. In one or more embodiments, the second retracted position is a zero position below which the second support block 360 cannot be moved.

The second movement range MR2 overlaps with the first movement range MR1 by an overlap range OR1. In FIG. 5, the position 507 is shown in an inside condition such that the upper end 505 is in the first movement range MR1. The first support block 30 can be lowered to an outside condition such that the upper end 505 is below the first end linear position 502 and outside of the first movement range MR1.

The first movement range MR1 and/or the second movement range MR2 can be defined (e.g., bounded) by items that limit the linear movement of the respective support blocks 330, 360 and/or items that limit the linear movement of the respective traveling blocks 322, 352. In one or more embodiments, the first movement range MR1 and/or the second movement range MR2 are defined (e.g., bounded) by one or more of the stops described herein. In one or more embodiments, the first movement range MR1 and/or the second movement range MR2 are defined (e.g., bounded) by the threaded lengths of the respective drive shafts 321, 351.

The third motor 370 is configured to rotate the first shaft 126 of the first support frame 199 using a rotor 371 coupled to the first shaft 126. The rotor 371 and the first shaft 126 are configured to rotate within and relative to the first support block 330. The third motor 370 can rotate the first support frame 199 (and the substrate supports 212 and the substrates 107 of the cassette 1030 supported by the first support frame 199) during a deposition operation, such as an epitaxial deposition operation.

Each motor 310, 340, 370 can include, for example, an electric motor, such as a servo motor. Other motors are contemplated for the respective motors 310, 340, 370. The first and second motors, 340 can respectively be a rotary motor or a linear motor. The third motor 370 can be a rotary motor.

The lift assembly 300 includes one or more position sensors 389 that are configured to measure the vertical position of the first support frame 199 and/or the second support frame 198 across a plurality of positions. The, plurality of positions can include, for example, a processing position, a transfer position, and a rotation initiation position for the first support frame 199. The one or more position sensors 389 are in communication with the controller 1070. When the one or more position sensors 389 detect the rotation initiation position of the first support frame 199, the controller 1070 automatically instructs the third motor 370 to begin rotating the first support frame 199 (and the cassette 1030). The rotation initiation position is vertically between the processing position and the transfer position such that the first support frame 199 passes the rotation initiation position while raising from the transfer position and toward the processing position. The plurality of positions can include a home position (e.g., for the first support frame 199) between the rotation initiation position and the transfer position.

The position 507 of the first support block 330 can be determined, for example, by monitoring the first motor 310 using the controller 1070. In one or more embodiments, the controller 1070 monitors a number of revolutions (e.g., rotations) of the rotor of the first motor 310 and correlates the number of revolutions to a parameter of distance-per-revolutions to determine the position 507. The position 517 of the second support block 360 can be determined, for example, by monitoring the second motor 340 using the controller 1070. In one or more embodiments, the controller 1070 monitors a number of revolutions (e.g., rotations) of the rotor of the second motor 340 and correlates the number of revolutions to a parameter of distance-per-revolutions to determine the position 507. The one or more position sensors 389 can be used to detect surface(s) horizontally aligned with the one or more position sensors 389 to determine if the position 507 is at the first end linear position 502 and/or the position 517 is at the first end linear position 512. For example, the one or more sensors 389 can detect a side surface 521 of the plate 359 when the side surface 521 is aligned with the one or more sensors 389. When the one or more sensors 389 detect the side surface 521, the controller 1070 can determine that the second support block 360 is at the first end linear position 512 (e.g., is at the home position). As another example, the one or more sensors 389 can detect a side surface 522 of the first support block 330 when the side surface 522 is aligned with the one or more sensors 389. When the one or more sensors 389 detect the side surface 522, the controller 1070 can determine that the first support block 330 is at the first end linear position 502 (e.g., is at the home position).

A first seal sleeve 381 is disposed between the first support block 330 and the second support block 360, and a second seal sleeve 382 is disposed between the second support block 360 and an end flange 383 of the lift assembly 300. The second shaft 125 interfaces with a shoulder of a support ring 384. A clamp ring 385 couples the support ring 384, the first seal sleeve 381, and the second seal sleeve 382 to the second support block 360. The clamp ring 385 can be fastened to the second support block 360 using one or more fasteners. The first seal sleeve 381 and the second seal sleeve 382 can respectively include a bellows, such as a bellows formed of a metallic material or a metallized material.

Figure 6:
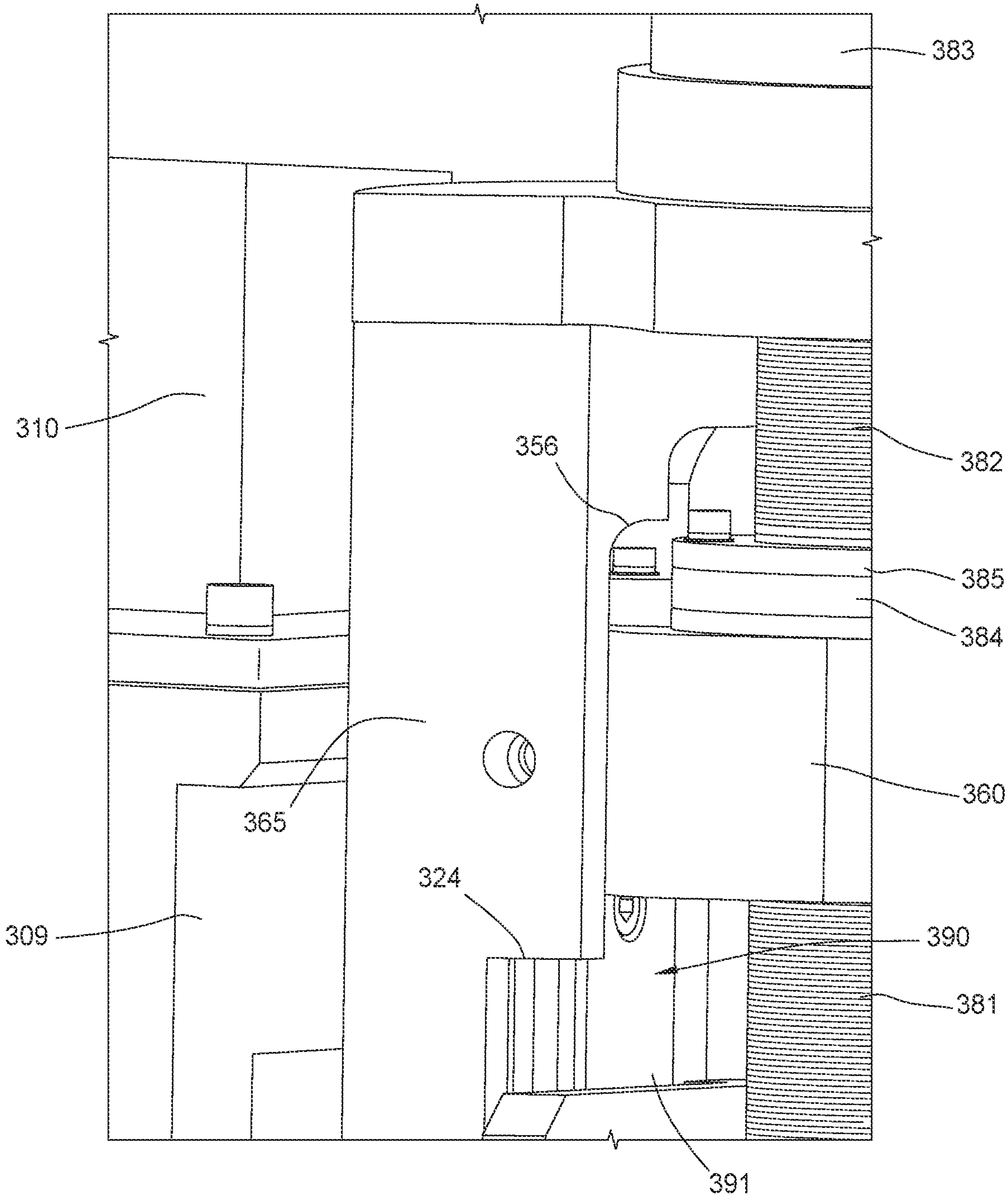
FIG. 6 is a partial schematic enlarged perspective front view of a second side of the lift assembly shown in FIGS. 3-5, according to one or more embodiments.

FIG. 6 is a partial schematic enlarged perspective front view of a second side of the lift assembly 300 shown in FIGS. 3-5, according to one or more embodiments.

One or more stops 356 (such as ledge(s) of the support beam 365) can limit the linear movement of the second support block 360. A track plate 390 can be coupled to the support beam 365. The track plate 390 includes one or more protrusions 391 that are received in one or more recesses of the first support block 330 and/or one or more recesses of the second support block 360 such that the first support block 330 and/or the second support block 360 can slide linearly along the track plate 390.

Figure 7A:
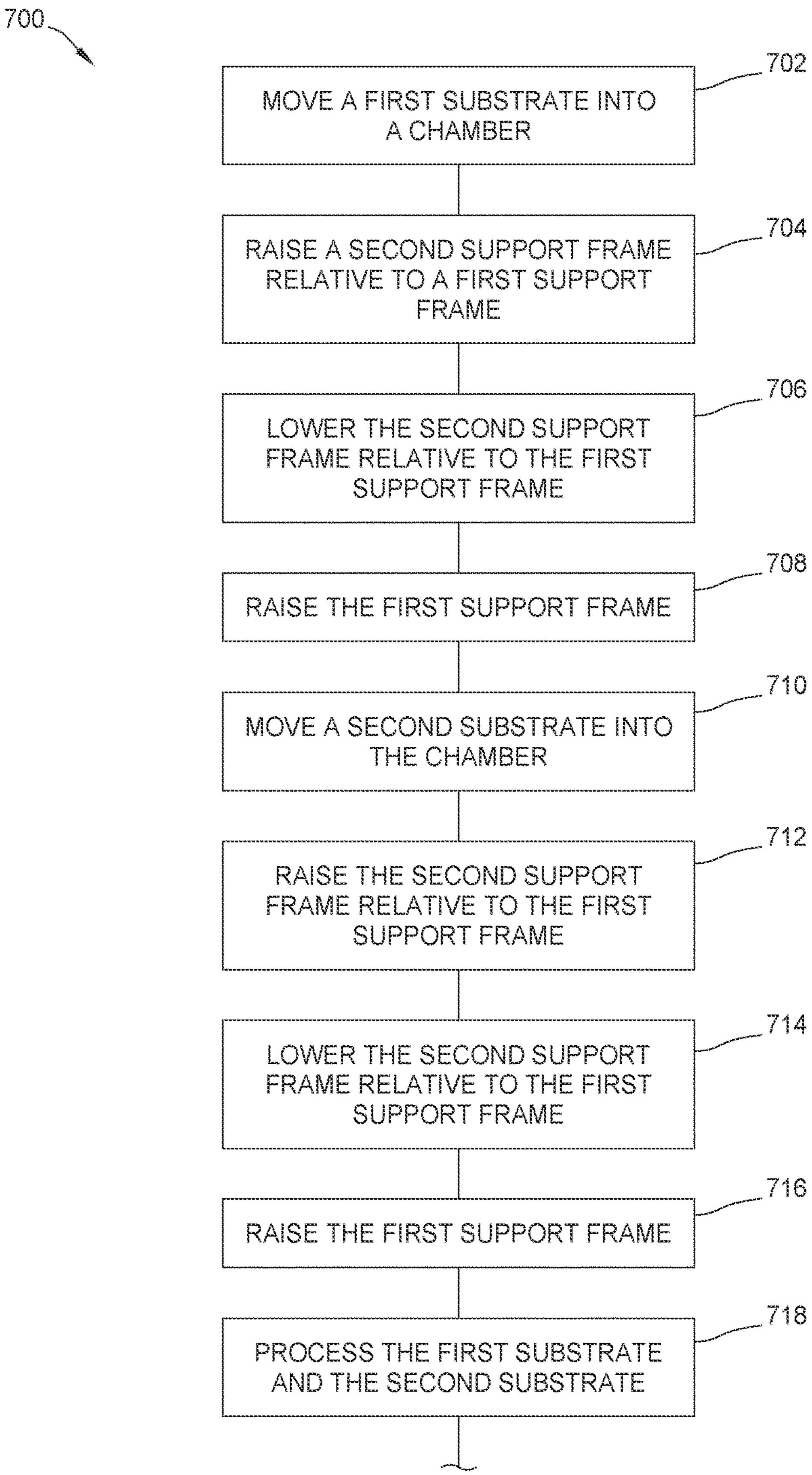
FIG. 7A is a schematic block diagram view of a method of transferring substrates, according to one or more embodiments.

FIG. 7A is a schematic block diagram view of a method 700 of transferring substrates, according to one or more embodiments.

Figure 7B:
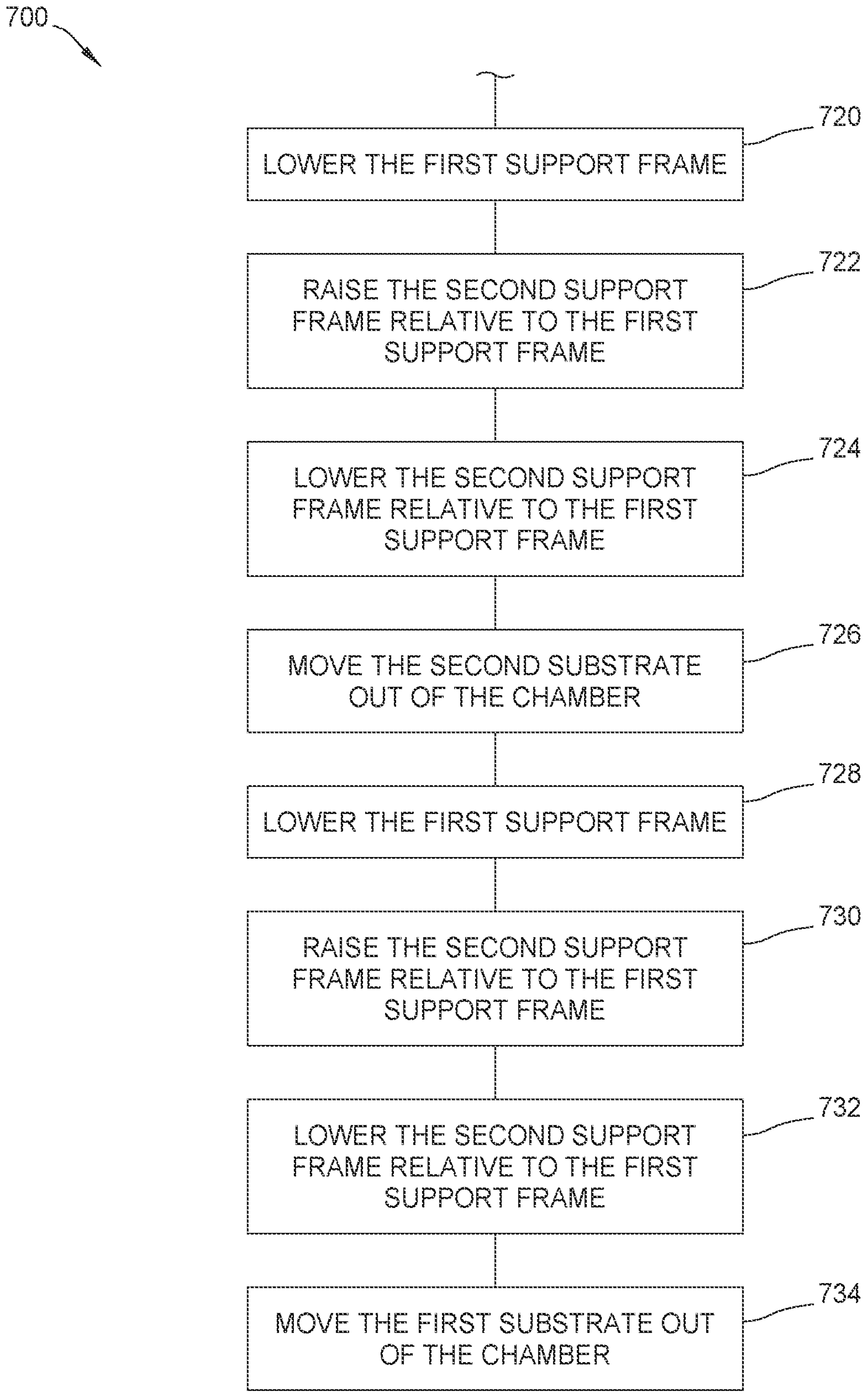
FIG. 7B is a schematic block diagram view of the continuation of the method shown in FIG. 7A, according to one or more embodiments.

FIG. 7B is a schematic block diagram view of the continuation of the method 700 shown in FIG. 7A, according to one or more embodiments.

Operation 702 includes moving a first substrate into a chamber (such as an epitaxial deposition chamber). The first substrate can be moved in the chamber, for example, through the transfer opening 136 and on a robot arm (such as on a robot blade of the robot arm).

Operation 704 includes raising a second support frame (such as the second support frame 198) relative to a first support frame (such as the first support frame 199) to engage the first substrate. The first support frame is positioned at a transfer position. The first support frame includes a first shaft and a plurality of first arms, and the second support frame includes a second shaft and a plurality of second arms. The raising can include engaging the first substrate and then lifting the first substrate from the robot arm. In one or more embodiments, the raising of the second support frame to engage the first substrate includes the plurality of second arms raising a plurality of lift pins that engage the first substrate.

Operation 706 includes lowering the second support frame relative to the first support frame to land the first substrate on a first substrate support. The first substrate support can be part of a cassette (such as the cassette 1030) supported by the first support frame.

Operation 708 includes raising the first support frame. In one or more embodiments, the first support frame is raised to align a second substrate support (which is positioned below the first substrate support) with the transfer opening 136. In one or more embodiments, the second support frame is raised at least partially simultaneously with the raising of the first support frame.

The present disclosure contemplates that operation 706 could be omitted, and the raising of operation 708 can engage the first substrate support with the first substrate to land the first substrate on the first substrate support.

Operation 710 includes moving a second substrate into the chamber.

Operation 712 includes raising the second support frame relative to the first support frame to engage the second substrate. The raising can include engaging the second substrate and then lifting the second substrate from the robot arm.

Operation 714 includes lowering the second support frame relative to the first support frame to land the second substrate on the second substrate support.

Operation 716 includes raising the first support frame into a processing position (such as the position of the cassette 1030 shown in FIG. 1).

Operation 718 includes processing the first substrate and the second substrate. In one or more embodiments, the processing includes epitaxially depositing one or more layers respectively on the first substrate and the second substrate. The first support frame (and the cassette 1030 supported by the first support frame) can be rotated during the processing.

Operation 720 (shown in FIG. 7B) includes lowering the first support frame. The first support frame can be lowered back to the transfer position.

Operation 722 includes raising the second support frame relative to the first support frame to engage the second substrate. The raising can include engaging the second substrate (such as by using the lift pins) and lifting the second substrate from the second substrate support such that the robot arm can be positioned under the second substrate.

Operation 724 includes lowering the second support frame relative to the first support frame to disengage the second substrate (e.g., such that the second substrate lands on the robot arm and continued lowering of the lift pins disengages the lift pins from the second substrate).

Operation 726 includes moving the second substrate out of the processing chamber (e.g., on the robot arm).

Operation 728 includes lowering the first support frame. In one or more embodiments, the first support frame is raised to align the first substrate support with the transfer opening 136. In one or more embodiments, the second support frame is lowered at least partially simultaneously with the lowering of the first support frame.

Operation 730 includes raising the second support frame relative to the first support frame to engage the first substrate. The raising can include engaging the first substrate (such as by using the lift pins) and lifting the first substrate from the first substrate support such that the robot arm can be positioned under the first substrate.

Operation 732 includes lowering the second support frame relative to the first support frame to disengage the first substrate (e.g., such that the second first lands on the robot arm and continued lowering of the lift pins disengages the lift pins from the second substrate).

Operation 734 includes moving the first substrate out of the processing chamber (e.g., on the robot arm).

The method 700 can be conducted at least partially using the lift assembly 300 shown in FIGS. 3-5 and/or the processing apparatus 100 shown in FIGS. 1 and 2.

FIGS. 8A-8D show an operation flow (from a partial schematic side view) of transferring two substrates 107*a*, 107B onto a cassette in a processing chamber, according to one or more embodiments.

Figure 8A:
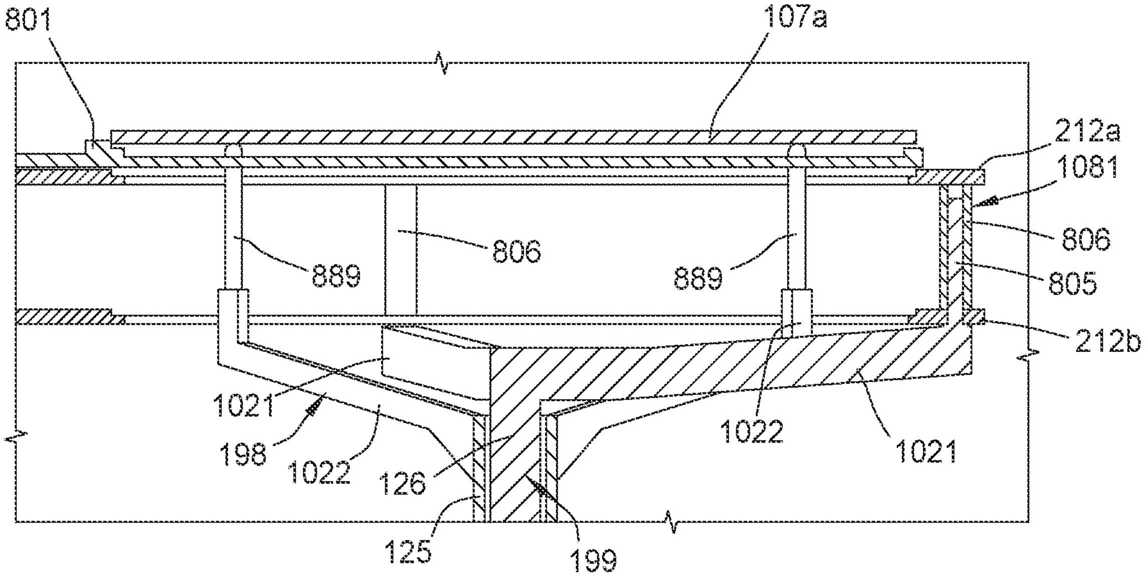
FIGS. 8A-8D show an operation flow (from a partial schematic side view) of transferring two substrates onto a cassette in a processing chamber, according to one or more embodiments.

In FIG. 8A, a robot blade 801 has been extended into the processing chamber above a first substrate support 212A, and the second support frame 198 has been raised such that lift pins 889 engage and lift a first substrate 107A from the robot blade 801. The lift pins 889 can directly engage the first substrate 107A, or the lift pins 889 can indirectly engage the first substrate 107A using a structure between the lift pins 889 and the first substrate 107A.

Figure 8B:
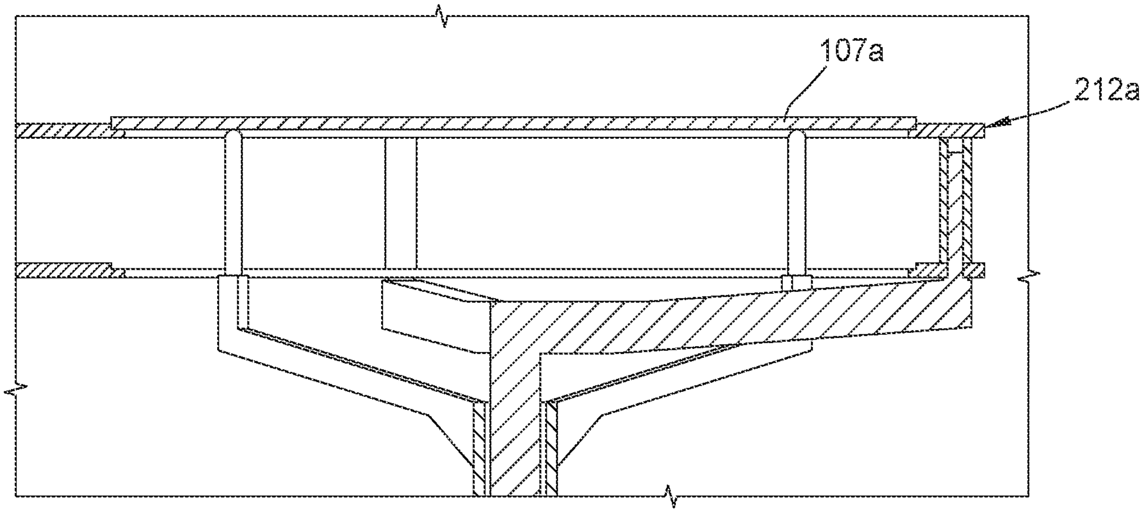

In FIG. 8B, the robot blade 801 has been retracted from the processing chamber. The second support frame 198 has been lowered to land the first substrate 107A on the first substrate support 212A.

Figure 8C:
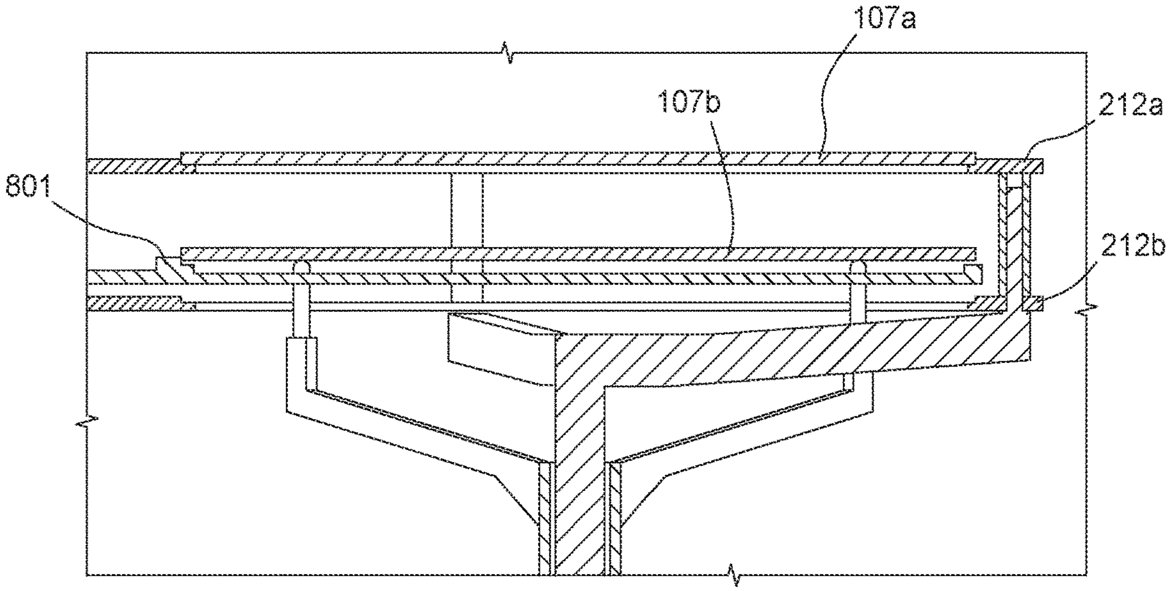

In FIG. 8C, the first support frame 199 has been raised relative to the position shown in FIGS. 8A, 8B, and the robot blade 801 has been extended into the processing chamber above a second substrate support 212B. In FIG. 8C, the second support frame 198 has been raised such that lift pins 889 engage and lift a second substrate 107B from the robot blade 801. The lift pins 889 can directly engage the second substrate 107B, or the lift pins 889 can indirectly engage the second substrate 107B using a structure between the lift pins 889 and the second substrate 107B.

Figure 8D:
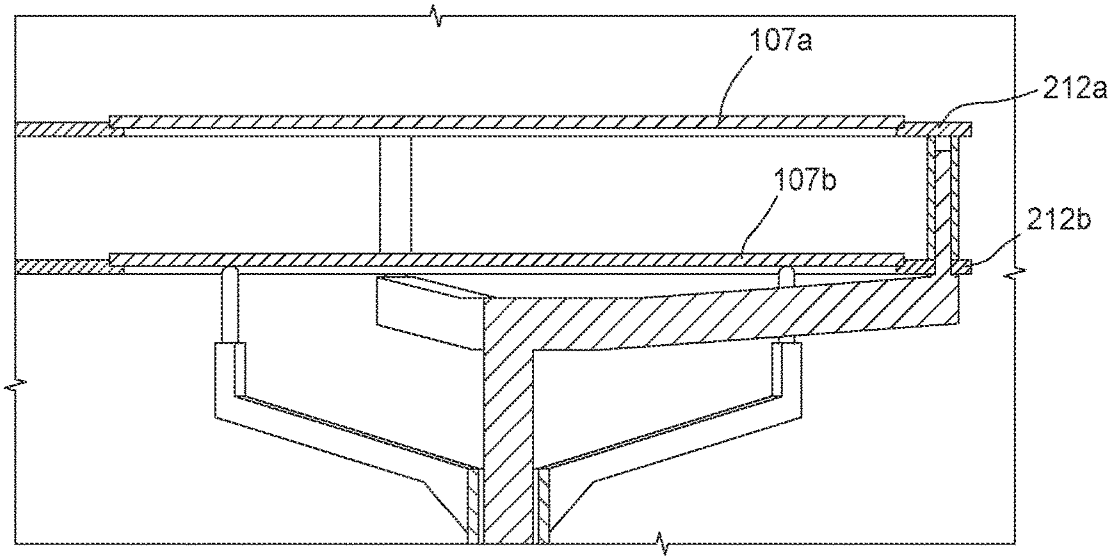

In FIG. 8D, the robot blade 801 has been retracted from the processing chamber. The second support frame 198 has been lowered to land the second substrate 107B on the second substrate support 212B.

In one or more embodiments, as shown in FIGS. 8A-8D, the first arms 1021 respectively include a column 805 that extends through one or more (such as one, some, or all) of the substrate supports 212. The columns 805 are respectively part of support columns 1081 that support the substrate supports 212. The substrate supports 212 are spaced from each other using one or more sleeves 806 (e.g., hollow cylinder(s)) disposed therebetween. The support columns 1081 respectively include one or more sleeves 806 about the respective column 805.

Figure 9:
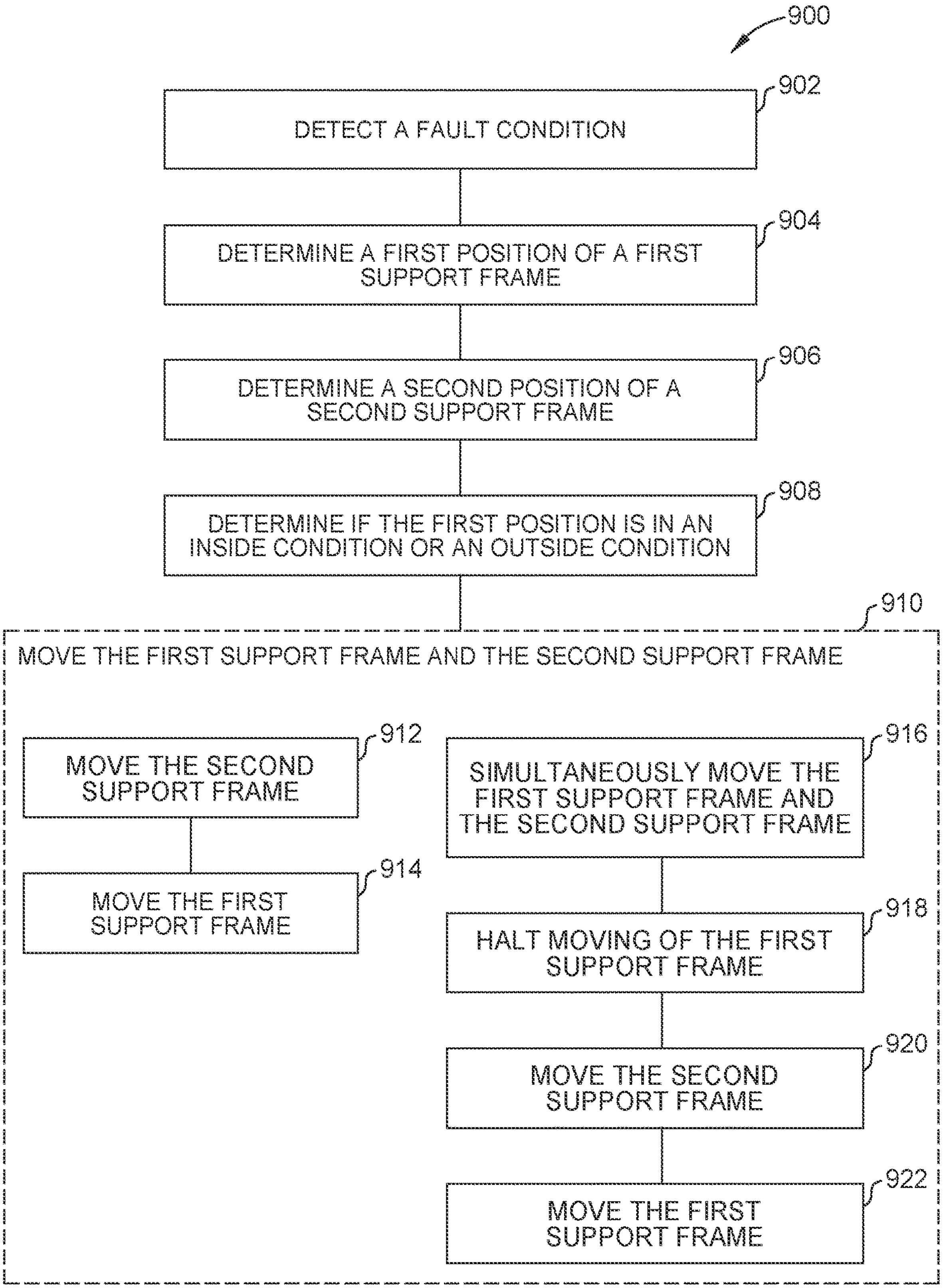
FIG. 9 is a schematic diagram view of a method of homing support frames, according to one or more embodiments.

FIG. 9 is a schematic diagram view of a method 900 of homing support frames, according to one or more embodiments.

Operation 902 includes detecting a fault condition. In one or more embodiments, the fault condition is a notification that a user has selected to halt a processing operation. In one or more embodiments, the fault condition indicates that a processing parameter (such as a processing temperature and/or a processing pressure) is not being met. In one or more embodiments, the fault condition indicates that a component has failed (e.g., broken) and/or that maintenance is needed. For example, the component that has failed can be a bearing such that rotation of the first shaft 126 has ended. The present disclosure contemplates that other fault condition(s) can be detected.

Operation 904 includes determining a first position of a first support frame (such as the first support frame 199) along a first movement range. The first movement range is between a first end linear position and a second end linear position of the first support frame. In one or more embodiments, the first position is a first linear position of a first support block (such as the first support block 330). The first support block supports a first shaft of the first support frame such that linear movement of the first support block linearly moves the first support frame. In one or more embodiments, the first position of the first support frame is defined by an upper end (such as the upper end 505) of the first support block.

Operation 906 includes determining a second position of a second support frame (such as the second support frame 198) along a second movement range. The second movement range is between a first end linear position and a second end linear position of the second support frame. The second movement range overlaps with the first movement range by an overlap range. In one or more embodiments, the second position is a second linear position of a second support block (such as the second support block 360) that supports a second shaft of the second support frame such that linear movement of the second support block linearly moves the second support frame. In one or more embodiments, the second position of the second support frame is defined by a lower end (such as the lower end 515) of the second support block.

Operation 908 includes determining if the first position is in an inside condition or an outside condition. The inside condition is within the overlap range, and the outside condition is outside of the overlap range.

Operation 910 includes moving (e.g., lowering) the first support frame and the second support frame respectively to a first retracted position and a second retracted position.

If the first position is in the outside condition (of operation 908), the moving includes (at operation 912) moving the second support frame to the second retracted position, and after the second support frame reaches the second retracted position, (at operation 914) moving the first support frame to the first retracted position.

If the first position is in the inside condition (of operation 908), the moving includes (at operation 916) simultaneously moving the first support frame and the second support frame until the first position is in the outside condition, and (at operation 918) halting the moving of the first support frame. The moving includes (at operation 920) moving the second support frame to the second retracted position, and after the second support frame reaches the second retracted position, (at operation 922) moving the first support frame to the first retracted position.

In one or more embodiments, the moving of the first support frame includes rotating a first drive shaft to linearly move a first traveling block disposed along the first drive shaft, and the first traveling block is coupled to the first support block. In one or more embodiments, the moving of the second support frame includes rotating a second drive shaft to linearly move a second traveling block disposed along the second drive shaft, and the second traveling block is coupled to the second support block.

The present disclosure contemplates that one or more (such as one or all) operations of the method 900 can be conducted simultaneously, before, and/or after one or more operations of the method 700 and/or one or more operations of FIGS. 8A-8D. In one or more embodiments, the fault condition is detected at operation 902 during conduction of the method 700. In one or more embodiments, upon detection of the fault condition, conduction of the method 700 is halted (e.g., at least temporarily), and operations 902-910 are conducted.

One or more operations of the present disclosure can be conducted automatically, such as by using the controller 1070. In one or more embodiments, operations are continuously monitored and when the fault condition is detected at operation 902, operations 904-910 of the method 900 are automatically conducted.

Benefits of the present disclosure include homing support frames with reduced or eliminated chances of collision, damage, and/or failure of components; reduced machine downtime, processing delays, and costs; increased throughput; homing with reduced extraneous movements; and homing support frames in relation to processing chambers that have smaller dimensions and small footprints.

Benefits of the present disclosure include independently moving support blocks and corresponding support frames at any given point in time, in any sequence, and at any linear position (e.g., within ranges allowed by stops-if used); and quickly loading and unloading substrates from cassettes for batch substrate processing operations. The three motors described herein can be used independently to do one, some, or all of the following at any point in time and at any linear location: linearly move the first support frame 199, rotate the first support frame 199, and/or linearly move the second support frame 198. One of the two support frames 198, 199 can be raised or lowered without first raising or lowering the other of the two support frames 198, 199.

As an example, the second support frame 198 can be raised and lowered while the first support frame 199 is stationary, and the first support frame 199 can be raised and lowered while the second support frame 198 is stationary. As another example, the first support frame 199 and the second support frame 198 can be raised and lowered simultaneously. Such modularity in independent movement facilitates a variety of movement sequences of the support frames 198, 199 to facilitate methods (such as the method 700) that quickly and simply load and unload a plurality of substrates to and from a cassette for batch processing.

As another example, the first support frame 199 and the second support frame 198 can move to respective first and second home positions (e.g., lowermost positions) in a streamlined manner while reducing or eliminating collision between the first support block 330 and the second support block 360. The first support frame 199 and the second support frame 198 can move to the respective first and second home positions (e.g., the lowermost positions) in a streamlined manner while reducing or eliminating collision between the first support frame 199 and the second support frame 198. For example, collision between the first arms 1021 and the second shaft 125 is reduced or eliminated. Such benefits can be facilitated for chambers and systems having smaller dimensions and footprints (e.g., vertical dimensions), such as a smaller vertical dimension below the floor 134 and/or below the bottom 135. Such benefits can be facilitated for chambers and systems that have the overlapping range OR1, and chambers and systems that have a relatively higher overlapping range OR1.

It is contemplated that aspects described herein can be combined. For example, one or more features, aspects, components, operations, and/or properties of the processing apparatus 100, the cassette 1030, the lift assembly 300, the method 700, the cassette shown in FIGS. 8A-8D, and/or the method 900 can be combined. It is further contemplated that any combination(s) can achieve the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A non-transitory computer readable medium comprising instructions that, when executed, cause a plurality of operations to be conducted, the plurality of operations comprising:

detecting a fault condition;

determining a first position of a first support frame along a first movement range, wherein the first position is a first linear position of a first support block that supports a first shaft of the first support frame such that linear movement of the first support block linearly moves the first support frame;

determining a second position of a second support frame along a second movement range, the second movement range overlapping with the first movement range by an overlap range;

determining if the first position is in an inside condition or an outside condition, the inside condition is within the overlap range, and the outside condition is outside of the overlap range; and moving the first support frame and the second support frame respectively to a first retracted position and a second retracted position.

2. The non-transitory computer readable medium of claim 1, wherein if the first position is in the outside condition, the moving comprises:

moving the second support frame to the second retracted position; and after the second support frame reaches the second retracted position, moving the first support frame to the first retracted position.

3. The non-transitory computer readable medium of claim 1, wherein if the first position is in the inside condition, the moving comprises:

simultaneously moving the first support frame and the second support frame until the first position is in the outside condition;

halting the moving of the first support frame;

moving the second support frame to the second retracted position; and after the second support frame reaches the second retracted position, moving the first support frame to the first retracted position.

4. The non-transitory computer readable medium of claim 1, wherein the first movement range is between a first end linear position and a second end linear position of the first support frame, and the second movement range is between a first end linear position and a second end linear position of the second support frame.

5. The non-transitory computer readable medium of claim 1, wherein the second position is a second linear position of a second support block that supports a second shaft of the second support frame such that linear movement of the second support block linearly moves the second support frame.

6. The non-transitory computer readable medium of claim 5, wherein the first position of the first support frame is defined by an upper end of the first support block.

7. The non-transitory computer readable medium of claim 6, wherein the second position of the second support frame is defined by a lower end of the second support block.

8. The non-transitory computer readable medium of claim 5, wherein:

the moving of the first support frame comprises rotating a first drive shaft to linearly move a first traveling block disposed along the first drive shaft, wherein the first traveling block is coupled to the first support block; and the moving of the second support frame comprises rotating a second drive shaft to linearly move a second traveling block disposed along the second drive shaft, wherein the second traveling block is coupled to the second support block.

9. A lift assembly for disposition in relation to a substrate processing chamber, the lift assembly comprising:

a first motor;

a first drive assembly coupled to the first motor;

a first support block coupled to the first drive assembly, the first support block supporting a first support frame, and the first motor configured to linearly move the first support block using the first drive assembly;

a second motor;

a second drive assembly coupled to the second motor;

a second support block coupled to the second drive assembly, the second support block supporting a second support frame, and the second motor configured to linearly move the second support block using the second drive assembly, the second motor configured to linearly move the second support block independently of the first motor linearly moving the first support block; and a controller in communication with the first motor and the second motor, the controller comprising instructions that, when executed by a processor, cause a plurality of operations to be conducted, the plurality of operations comprising:

detecting a fault condition, determining a first position of the first support block along a first movement range, wherein the first position is a first linear position of the first support block that supports a first shaft of a first support frame such that linear movement of the first support block linearly moves the first support frame, determining a second position of the second support block along a second movement range, the second movement range overlapping with the first movement range by an overlap range, determining if the first position is in an inside condition or an outside condition, the inside condition is within the overlap range, and the outside condition is outside of the overlap range, and moving the first support block and the second support block respectively to a first retracted position and a second retracted position.

10. The lift assembly of claim 9, wherein:

the first drive assembly comprises:

a first drive shaft coupled to the first motor, and a first traveling block disposed along the first drive shaft, wherein the first traveling block is coupled to the first support block;

the moving of the first support block comprises driving the first motor to rotate the first drive shaft;

the second drive assembly comprises:

a second drive shaft coupled to the second motor, and a second traveling block disposed along the second drive shaft, wherein the second traveling block is coupled to the second support block; and the moving of the second support block comprises driving the second motor to rotate the second drive shaft.

11. The lift assembly of claim 10, wherein:

the first drive shaft is a first lead screw, and a first threaded interface is between the first lead screw and the first traveling block; and the second drive shaft is a second lead screw, and a second threaded interface is between the second lead screw and the second traveling block.

12. The lift assembly of claim 10, wherein the first support block comprises one or more first legs that couple to the first traveling block, and the second support block comprises one or more second legs that couple to the second traveling block.

13. The lift assembly of claim 10, further comprising a third motor coupled to the first support block, wherein:

the second support block supports a second shaft of the second support frame such that linear movement of the second support block linearly moves the second support frame; and the third motor is configured to rotate the first shaft of the first support frame.

14. The lift assembly of claim 13, wherein:

linear movement of the first traveling block linearly moves the first support block and the first support frame;

linear movement of the second traveling block linearly moves the second support block and the second support frame; and the third motor is configured to rotate the first shaft of the first support frame.

15. An apparatus for substrate processing, comprising:

the lift assembly of claim 9;

a chamber body comprising:

a processing volume, a plurality of gas inject passages formed in the chamber body, and one or more gas exhaust passages formed in the chamber body;

one or more heat sources configured to generate heat; and a substrate support assembly positioned in the processing volume, the substrate support assembly comprising:

a plurality of lift pins, one or more substrate supports, the first support frame comprising the first shaft and a plurality of first arms, the plurality of first arms configured to interface with the plurality of lift pins, and the second support frame comprising a second shaft and a plurality of second arms, the plurality of second arms configured to support the one or more substrate supports, and the second shaft supported by the second support block.

16. A method of transferring substrates, comprising:

moving a first substrate into a chamber;

raising a second support frame relative to a first support frame to engage the first substrate, the first support frame comprising a first shaft and a plurality of first arms, and the second support frame comprising a second shaft and a plurality of second arms;

lowering the second support frame relative to the first support frame to land the first substrate on a first substrate support;

detecting a fault condition;

determining a first position of the first support frame along a first movement range, wherein the first position is a first linear position of a first support block that supports a first shaft of the first support frame such that linear movement of the first support block linearly moves the first support frame;

determining a second position of the second support frame along a second movement range, the second movement range overlapping with the first movement range by an overlap range;

determining if the first position is in an inside condition or an outside condition, the inside condition is within the overlap range, and the outside condition is outside of the overlap range; and lowering the first support frame and the second support frame respectively to a first retracted position and a second retracted position.

17. The method of claim 16, further comprising:

raising the first support frame in a direction away from the first retracted position;

moving a second substrate into the chamber;

raising the second support frame relative to the first support frame and in a direction away from the second retracted position to engage the second substrate; and lowering the second support frame relative to the first support frame to land the second substrate on a second substrate support.

18. The method of claim 17, further comprising:

raising the first support frame into a processing position;

processing the first substrate and the second substrate; and lowering the first support frame.

19. The method of claim 16, wherein the raising of the second support frame to engage the first substrate comprises:

the plurality of second arms raising a plurality of lift pins that engage the first substrate.

* * * * *